United States Patent
Ferrucci et al.

(10) Patent No.: US 11,847,575 B2
(45) Date of Patent: Dec. 19, 2023

(54) KNOWLEDGE REPRESENTATION AND REASONING SYSTEM AND METHOD USING DYNAMIC RULE GENERATOR

(71) Applicant: Elemental OpCo, LLC, Wilton, CT (US)

(72) Inventors: David Ferrucci, Wilton, CT (US); Aditya Kalyanpur, Fort Lee, NJ (US); Jennifer Chu-Carroll, Dobbs Ferry, NY (US); Thomas Breloff, Brooklyn, NY (US); Or Biran, Sleepy Hollow, NY (US); David Buchanan, Pleasantville, NY (US)

(73) Assignee: Elemental Cognition Inc., New York, NY (US)

( * ) Notice: Subject to any disclaimer, the term of this patent is extended or adjusted under 35 U.S.C. 154(b) by 644 days.

(21) Appl. No.: 17/009,629

(22) Filed: Sep. 1, 2020

(65) Prior Publication Data
US 2022/0067540 A1     Mar. 3, 2022

(51) Int. Cl.
*G06N 5/025*     (2023.01)
*G06N 5/04*      (2023.01)
*G06N 5/022*     (2023.01)

(52) U.S. Cl.
CPC ........... *G06N 5/025* (2013.01); *G06N 5/022* (2013.01); *G06N 5/04* (2013.01)

(58) Field of Classification Search
None
See application file for complete search history.

(56) References Cited

U.S. PATENT DOCUMENTS

2014/0072948 A1\*   3/2014   Boguraev ............... G09B 7/00
                                                          434/362
2020/0242146 A1\*   7/2020   Kalukin ............ G06F 16/3329

OTHER PUBLICATIONS

Furbach et al., An application of automated reasoning in natural language question answering, Ai Communications 23.2-3 (2010); Total pp. 27 (Year: 2010).\*
Glockner et al., An Integrated Machine Learning and Case-Based Reasoning Approach to Answer Validation, 2012 11th International Conference on Machine Learning and Applications; pp. 494-499 (Year: 2012).\*

(Continued)

*Primary Examiner* — Alan Chen
(74) *Attorney, Agent, or Firm* — Lee & Hayes, P.C.

(57) ABSTRACT

A dynamic reasoning system may include a symbolic reasoning engine that iteratively calls a dynamic rule generator to answer an input query. The symbolic reasoning engine may determine a primary goal and/or secondary goals to generate proofs for the answer. The symbolic reasoning engine may call a rules component to provide rules to prove a current input goal. The rules component may use a static rule knowledge base and/or the dynamic rule generator to retrieve and rank rules relevant to the current input goal. The dynamic rule generator may generate new rules that lead to the current input goal. The dynamic rule generator may include a statistical model that generates unstructured or structured probabilistic rules based on context related to the input query. The symbolic reasoning engine may return a list of rules with confidence for explaining the answer to the input goal.

20 Claims, 9 Drawing Sheets

(56) References Cited

OTHER PUBLICATIONS

Rabiah et al., Intelligent Information Extraction using Logical Approach: Skolemize Clauses Binding. In Proceedings of Knowledge Management International Conference 2008, pp. 251-256 (Year: 2008).*

Weis, Karl-Heinz, A case based reasoning approach for answer reranking in question answering, arXiv preprint arXiv:1503.02917 2015; Total pp. 12 (Year: 2015).*

* cited by examiner

KNOWLEDGE REPRESENTATION AND REASONING SYSTEM AND METHOD USING DYNAMIC RULE GENERATOR

BACKGROUND

Symbolic artificial intelligence (AI) is a method in AI research that is based on high-level "symbolic" human-readable representations of problems, logic, and search. Implementations of symbolic AI reasoning include rules engines and/or knowledge graphs. In order to build a symbolic reasoning system able to receive an input query, answer the query, and produce explanations (e.g., logical proofs) the symbolic reasoning engine needs structured rules to provide the knowledge required. However, in applications, it is hard to acquire the necessary rules of inference. A rule of inference is a logical form that given some premise conditions may derive some conclusions. While the structured rules may be hand-coded by experts, hand-coded solutions generally do not scale well.

Moreover, given the task of Natural Language Understanding (NLU), where inference requires a lot of common-sense and background knowledge, and the specific inferences that apply to a question vary depending on a given context, determining all the necessary background inference rules beforehand can be very time-consuming and resource-intensive.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 illustrates an example implementation of select components that may be configured to be used with a natural language understanding (NLU) application.

FIG. 5 illustrates an example implementation of select components that may be configured to be used with a general computer application.

DETAILED DESCRIPTION

Figure 1:
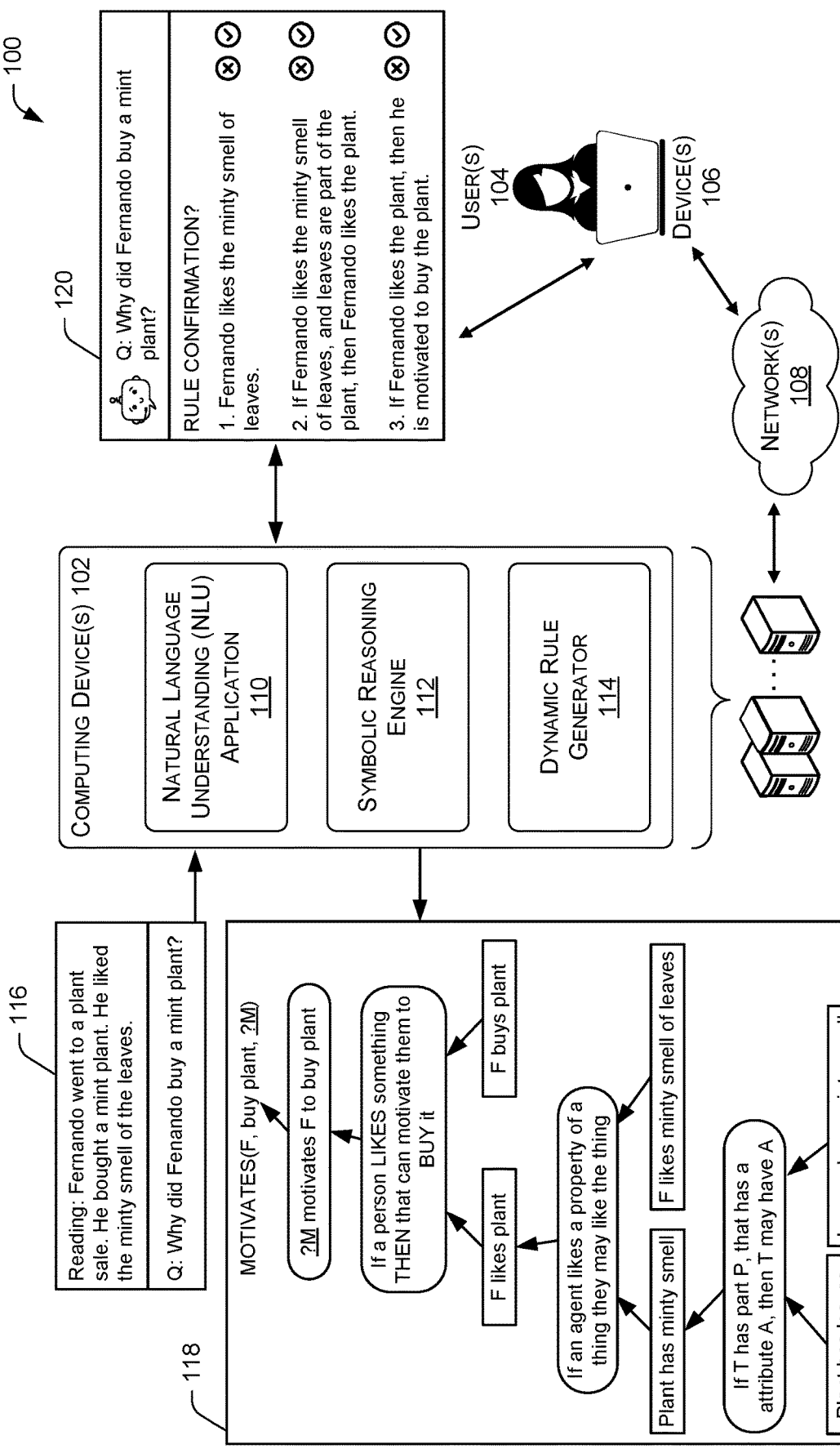
FIG. 1 illustrates an example system including a symbolic reasoning engine and a dynamic rule generator that is configured for use with a natural language understand (NLU) application, as described herein.

This disclosure is directed, in part, to a dynamic reasoning system with a symbolic reasoning engine that iteratively calls a dynamic rule generator to generate proofs for an input query. In some examples, the system may be configured to work in various computer application settings that may incorporate a traditional knowledge representation and reasoning (KRR) system. Like a traditional KRR system, the present system may receive an input query and generate an answer. Unlike the traditional KRR system, the reasoning engine of the present system may generate inference rules during run-time rather than rely on static rules.

In a non-limiting example, the system may be incorporated in a natural language understanding (NLU) application. The NLU application may receive a natural language reading content (e.g., story, article, text problem, etc.) and a question about the reading content as a reading comprehension task. The NLU application may parse the text of the reading content and the text of the question and convert the text into a structured representation that a machine can understand. The structure representation of the reading content may include the "context" of the reading content, which includes a list of facts about the reading content. The question and the context may be inputs for a symbolic reasoning engine. The symbolic reasoning engine may determine a primary goal or a secondary goal of a proof to arrive at an answer to the question. The proof may include a list of rules and facts from the context, to arrive at the primary or secondary goal. The symbolic reasoning engine may iteratively call a dynamic rule generator to derive a rule for a primary or secondary goal based on the context provided. The symbolic reasoning engine may continue retrieving rules until the system can match the rule conditions with the facts in the context. After the system has a list of inferred rules that can provide answers as a list of proofs, the proofs are returned to the NLU application, which translates the structured rules back into natural language text. The natural language text form of the proofs may be presented to a human user to verify whether the inferred rules are correct or incorrect. The inferred rules are marked as true positives or false positives for training the different components of the system.

This dynamic reasoning system provides a number of advantages over the traditional knowledge representation and reasoning (KRR) systems, which uses a static pre-defined set of rules, such as generating inference rules, during run-time, based on a current sub-goal the reasoner is evaluating, and considering the context of execution. The reasoning engine may iteratively call the dynamic rule generator as it explores the proof dependency graph to construct valid explanations. This provides a more scalable solution for reasoning in domains such as natural language understanding (NLU) which require a vast amount of background inferential knowledge.

Additionally, standard reasoning engines use a static knowledge base of rules to answer and/or prove queries and do not have the notion of dynamic rule-generation in context. For instance, as will be described herein with respect to FIGS. 1 and 4, the present system may generate rules such as, "If a person likes something, they are motivated to buy it," which is a general common-sense rule, and the rules of this nature/scope are hard to explicitly acquire and enumerate in a static rule knowledge base (KB). Recent efforts on combining symbolic reasoning with neural models use the notion of rule-induction where the system learns and/or induces rules from the training data, but at run-time, the reasoner still works with a fixed set of induced rules. Moreover, the process of creating structured rules is not only time-intensive and resource-intensive (e.g., higher costs), but adjustments to the data structure is similarly slow and costly. By integrating a dynamic rule generator, the system is able to continuously gather training data (e.g., generated inference rules) and can learn from the training data. For instance, based on the generated inference rules that are marked as correct or incorrect by users, the system may learn from these generated inference rules that are annotated with context and may learn to generate new rules based on previously tagged correct or incorrect rules. As such, as the system learns, the text parsing, the reasoning engine, the rules generating component, and other components may execute more efficiently and accurately.

Moreover, by creating a system that can dynamically generate rules for the symbolic reasoning engine without manual input from experts, the knowledge base of inference rules may grow more rapidly. This growth allows for a greater variety of topics to better engage users who may enjoy a different variety of applications. Thus, the present reasoning system provides improvement over traditional reasoning systems by providing a faster, more efficient, and less costly method to generate rules for, and adding rules to, the database. Finally, rather than remaining static as a traditional KRR system that relies on static rule knowledge base, the present system may learn and evolve to generate more complex inferred rules over time. By learning and evolving, the present system's ability to reason and provide answers with proof may continue to improve over time.

This system employs techniques from artificial intelligence, such as knowledge representation and reasoning (KRR) and machine learning (ML). In addition, it employs techniques from natural language processing (NLP), such as syntactic parsing, predicate-argument structure (PAS), entity type assignment, co-reference analysis, and statistical techniques such as distributional semantics (e.g. latent semantic analysis, random indexing, and topic modeling).

The techniques and systems described herein may be implemented in a number of ways. Example implementations are provided below with reference to the following figures.

Illustrative Environment

FIG. 1 illustrates an example system 100 including a symbolic reasoning engine and a dynamic rule generator that is configured for use with a natural language understand (NLU) application, as described herein. The system 100 may include user(s) 104 that utilizes device(s) 106, through one or more network(s) 108, to interact with the computing device(s) 102. In some examples, the network(s) 108 may be any type of network known in the art, such as the Internet. Moreover, the computing device(s) 102 and/or the device(s) 106 may be communicatively coupled to the network(s) 108 in any manner, such as by a wired or wireless connection.

The computing device(s) 102 may include any components that may be used to facilitate interaction between the computing device(s) 102 and the user(s) 104. For example, the computing device(s) 102 may include a natural language understanding (NLU) application 110, the symbolic reasoning engine 112, and a dynamic rule generator 114.

The NLU application 110 may engage with the user(s) 104 through interactive dialog. The NLU application 110 generates a user interface to engage in question-answering sessions with the user(s) 104 by natural language expressions. For instance, the user(s) 104 may type in questions in natural language text and the system may return logical proofs as answers and/or explanations in textual form.

In some examples, the NLU application 110 may receive a natural language reading content and a reading comprehension task to learn the natural language reading content. The NLU application 110 may use one or more models and/or parsers to process the reading content. The system may determine the context of the reading content while processing the reading content. The context of the reading content includes a set of facts about the reading content and may be processed as a list of factual rules. In some examples, the NLU application 110 may generate a question, about the content of the reading content, to test the reasoning and parsing ability of the system. In an alternative and/or additional example, the NLU application 110 may receive a question from the user(s) 104 about the content of the reading content. The NLU application 110 may interact with the symbolic reasoning engine 112 to provide an answer and may request a confirmation of the answer from the user(s) 104.

The symbolic reasoning engine 112 may include a formal-logic based reasoner that operates on structured queries and rules. The symbolic reasoning engine 112 may receive queries and may return answers and/or explanations. In some examples, symbolic reasoning engine 112 may return a logically valid answer with a proof dependency graph that explains the answer. The symbolic reasoning engine 112 may generate the proof dependency graph while iteratively calling the dynamic rule generator 114 to determine the relevant rules for the proof dependency graph.

The dynamic rule generator 114 may receive an input goal with context and determine a list of rules to return. As described herein, the context may include a list of facts. The dynamic rule generator 114 may use the list of facts to generate inferred rules. In some examples, the dynamic rule generator 114 may implement a latent generative model that does not explicitly encode all the rules and may use a statistical modeling approach to implicitly capture the rule knowledge and generate explicit rules on demand.

The user(s) 104, via the device(s) 106, may interact with the computing device(s) 102. The user(s) 104 may include any individuals, content writers, developers, analysts, engineers, crowdsourcing network members, teachers, and the like. In various examples, the user(s) 104 may include formal collaborators or untrained individuals who simply perform tasks posed by the system, including marking generated rules as correct or incorrect. In additional examples, the user(s) 104 may be part of an organized crowdsourcing network, such as the Mechanical Turk crowdsourcing platform.

The user(s) 104 may operate the corresponding device(s) 106 to perform various functions associated with the device(s) 106, which may include at least some of the operations and/or components discussed above with respect to the computing device(s) 102. The users may operate the device(s) 106 using any input/output devices including but not limited to mouse, monitors, displays, augmented glasses, keyboard, cameras, microphones, speakers, and headsets. In various examples, the computing device(s) 102 and/or the device(s) 106 may include a text-to-speech component that may allow the computing device(s) 102 to conduct a dialog session with the user(s) 104 by verbal dialog.

The device(s) 106 may receive content from the computing device(s) 102 including user interfaces to interact with the user(s) 104. In some examples, the user(s) 104 may include any number of human collaborators who are engaged by the device(s) 106 to interact with the computing device(s) 102 and verify the functions of one or more components of the computing device(s) 102. For instance, a human collaborator of the device(s) 106 may interact with the NLU application 110 and the device(s) 106 may receive a reading comprehension task that the system is currently working on. In the present example, the user(s) 104 may be present a reading content via a user interface and may be allowed to ask questions about the reading content to help train the system. The NLU application 110 may present an explanation (e.g., list of proofs) to the question with a list of generated rules and the user(s) 104 may be asked to verify whether the generated rules were correct or incorrect based on reading content.

In a non-limiting example, the NLU application 110 may receive an example task 116 and may use the symbolic reasoning engine 112 to work on the task. The NLU application 110 may convert the example task 116 including the reading content and question from text to structured representations.

In the present example, the NLU application 110 may interact with the symbolic reasoning engine 112 and provide a question portion of the example task 116 as input query and the reading content portion as context. For instance, the symbolic reasoning engine 112 may receive the task to determine the question, "Why did Fernando buy a mint plant?" Which may be translated from text to the structured representation:

MOTIVATES($F$,buy plant,$?M$)

The symbolic reasoning engine 112 may iteratively call the dynamic rule generator 114 to retrieve the relevant rules to generate the example proof graph 118. It is to be appreciated that although the example proof graph 118 illustrates unstructured rules, the dynamic rule generator 114 can be a statistical model that generates unstructured or structured probabilistic rules based on a specific context. The example proof graph 118 may include the context (e.g., list of facts) of the reading content. The process to generate the example proof graph 118 will be described herein with more detail with respect to FIG. 5. The symbolic reasoning engine 112 may return answers as a list of inferred rules to explain the proof. The NLU application 110 may present the answer as a list of proofs in an example explanations interface 120 to the user(s) 104. The NLU application 110 may prompt the user(s) 104 to provide negative or positive feedback for each inferred rules listed in the explanation. Based on the feedback received from the user(s) 104, the system may store the individual rules and associated feedback to improve the symbolic reasoning engine 112, the dynamic rule generator 114, the NLU application 110, and/or other associated components.

Figure 2:
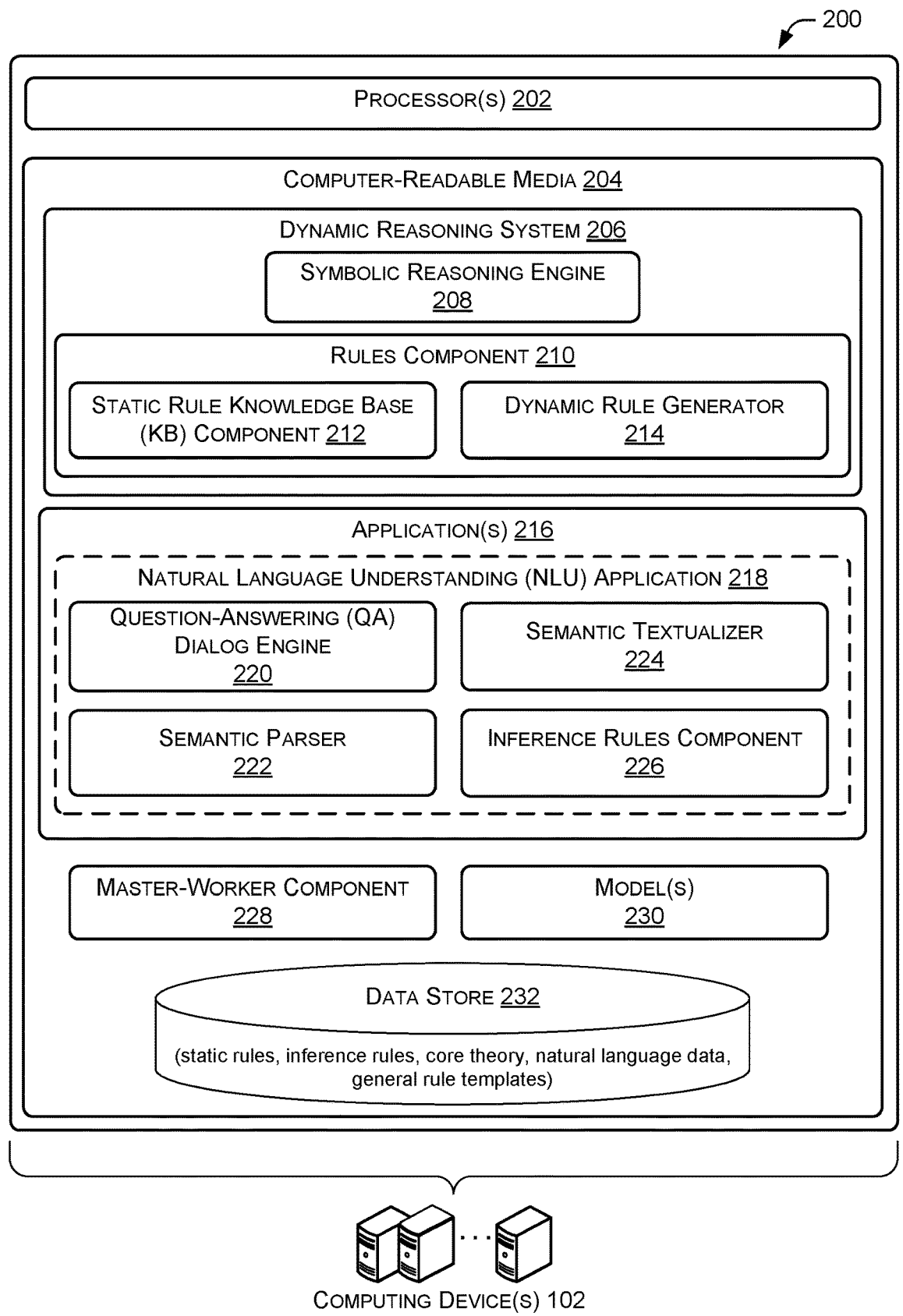
FIG. 2 is a block diagram of an example computing architecture associated with the system of FIG. 1.

FIG. 2 is a block diagram of an illustrative computing architecture 200 of the computing device(s) 102 of FIG. 1. The computing architecture 200 may be implemented in a distributed or non-distributed computing environment.

The computing architecture 200 may include one or more processors 202 and one or more computer-readable media 204 that stores various modules, data structures, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store a dynamic reasoning system 206 and associated components, and application(s) 216 and associated components, a master-worker component 228, model(s) 230, and the data store 232, which are described in turn. The components may be stored together or in a distributed arrangement.

The dynamic reasoning system 206 may include a symbolic reasoning engine 208 and a rules component 210 and associated components. The dynamic reasoning system 206 may leverage its components, the model(s) 230, and the data store 232 to build and evolve the knowledge base of static and inference rules. The dynamic reasoning system 206 may collect natural language data, retrieve static rules, general rules templates, and inferred rules as needed by the components. In various examples, the dynamic reasoning system 206 and/or one or more associated components may be part of a standalone application that may be installed and stored on the device(s) 106.

The symbolic reasoning engine 208 may receive an input query with context and may determine the answer to the query. The context may include a set of facts against which to evaluate the query. As described herein, the symbolic reasoning engine 208 may include a formal-logic based reasoner that operates on structured queries and rules. The symbolic reasoning engine 208 may determine the answer to the query by identifying explanations (also referred to as "proofs"). The symbolic reasoning engine 208 may return the explanations and/or logically valid answers. A logically valid answer may include a proof dependency graph that explains the answer with context. The symbolic reasoning engine 208 may generate the proof dependency graph while iteratively interacting with the rules component 210 determines the relevant rules for the proof dependency graph.

In some examples, the symbolic reasoning engine 208 may determine a reasoning algorithm to use for answering queries. The reasoning algorithm may include at least one of a backward chaining, forward chaining, Selective Linear Definite clause resolution ("SLD resolution"), and first-order logic ("FOL") algorithm. For instance, the symbolic reasoning engine 208 may be based on SLD resolution via backward chaining.

In a non-limiting example implementation, the symbolic reasoning engine 208 may use a backward chaining algorithm. The backward chaining algorithm may start by retrieving rules leading to an original query. The backward chainer may include a rule retriever and may call the dynamic rule generator 214. As will be described herein, the dynamic rule generator 214 may use a statistical model trained on structured rule applications in different contexts. The statistical model may generate new rules each leading to the original query and may associate each rule with a certain precision/confidence. The symbolic reasoning engine 208 may determine which rules to backchain on next based on one or more heuristics, including, but not limited to, aggregate confidence of the current proof path, a relevance of next rule given context/current proof path, a likelihood for success given prior successful explanations, and the like.

In various examples, the symbolic reasoning engine 208 may explore multiple rule paths in parallel. For instance, the antecedents of the back-chained rules now become new sub-goals (secondary goals) that the reasoner needs to prove and so it calls the rules component 210 again with these new sub-goals, in the next iteration. This process may continue until the symbolic reasoning engine 208 may match rule conditions with facts in the context (in which case, it has found a valid proof), or if the symbolic reasoning engine 208 fails to find complete proofs within practical resource limits (e.g. no more rules found above a predetermined confidence threshold). A complete proof/explanation is a set of inference rules and facts that logically entail the query.

In some examples, the symbolic reasoning engine 208 may determine that a complete proof cannot be found and may determine a "hint" to ask. A hint may include a near-miss rule that could complete the proof. In the present system, "hints" are "near-misses" in the proof graph, which if confirmed by the user(s) 104, would lead to a complete explanation. As described herein, a complete proof graph can match rules for all the conditions that need to be met. An incomplete proof may include one or more conditions that couldn't be met. The symbolic reasoning engine 208 may generate a hint based on the missing condition and ask the user(s) 104 if the hint is true or false. If the user(s) 104 confirms the request for the hint, then the symbolic reasoning engine 208 may convert the hint into a rule and may determine if the system could generate a complete proof.

For instance, the symbolic reasoning engine 208 may be given the example reading content:

Riley and Jamie bought a bottle of wine. Riley asked Jamie to store it in a cool and dark place. Jamie put it in the refrigerator.

The symbolic reasoning engine 208 may be tasked with answer the question:

Why did Jamie put the wine in the refrigerator?

The symbolic reasoning engine 208 would need to know that the refrigerator is a cold and dark place. The symbolic reasoning engine 208 may call the rules component 210 and may receive the knowledge that the refrigerator is cold, but the system may be missing the knowledge that a refrigerator is dark. In this case, the system may return an incomplete proof to the user(s) and may inform the user(s) 104 that the system is unable to find a proof because of a missing condition. The system may also ask the user(s) 104 for a hint, such as asking if the system is missing the fact: "Refrigerator is dark". Is this correct? If the user(s) 104 provides affirmative feedback, the knowledge can be added to the symbolic reasoning engine 208 and the system may find a complete proof.

In various examples, the symbolic reasoning engine 208 may use any portion of the static rules, inference rules, and/or general rule templates, stored in the data store 232, as input to train one or more reasoning model(s).

Figure 6:
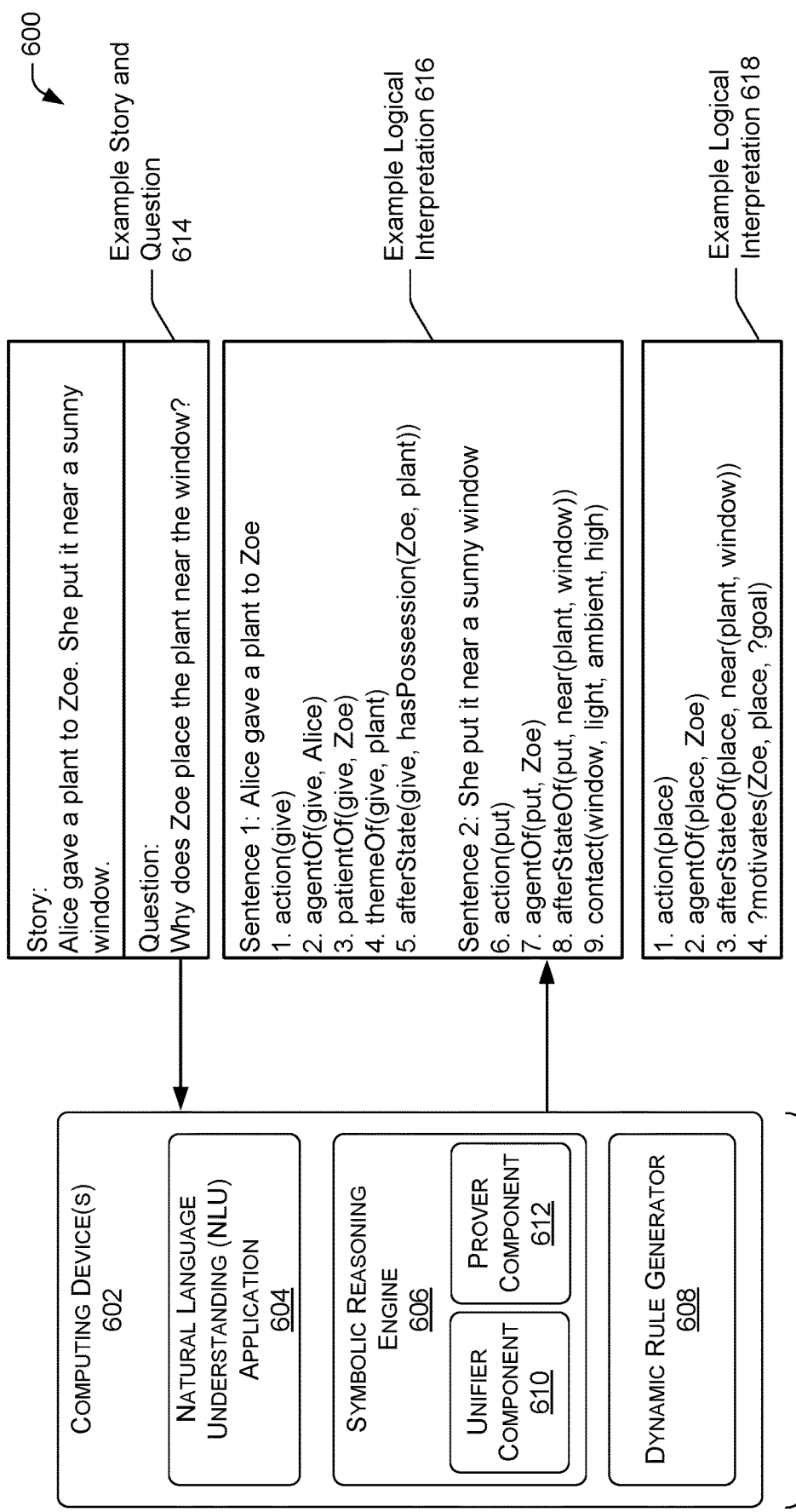
FIG. 6 illustrates an example system including a symbolic reasoning engine and a dynamic rule generator that is configured to generate the example logical interpretations, as described herein.

In some instances, the symbolic reasoning engine 208 can correspond to the symbolic reasoning engine 112 of FIG. 1 and the symbolic reasoning engine 606 of FIG. 6.

The rules component 210 may include a static rule knowledge base (KB) component 212 and a dynamic rule generator 214. The rules component 210 may receive an input goal in context and may return a ranked list of rules given the context. Each rule from the ranked list of rules may prove the input goal and may include associated confidence and/or precision. Confidence (also referred herein as "confidence value" or "confidence score") indicates the likelihood that an associated rule is true. In some examples, the confidence may be expressed as a confidence value and/or a conditional probability. The rules component 210 may retrieve a list of rules, which may be ranked based on confidence, using the static rule KB component 212 and/or the dynamic rule generator 214. In some examples, the rules component 210 may rank and/or re-rank the rules after retrieving the rules. In various examples, the ranking of the rules may be determined based at least in part on the associated confidence or in the case of multiple rules, the associated composite confidence. In some examples, the rules component 210, the static rule KB component 212, and the dynamic rule generator 214 may produce and/or retrieve rules that conform to the core-theory supported by the symbolic reasoning engine 208. In an alternative and/or additional example, the rules component 210 and associated components may use a translator to convert the rules to conform to the core-theory supported by the symbolic reasoning engine 208.

The static rule KB component 212 may include a knowledge base of a fixed collection of rules. In various examples, the rules from the collection of rules may individually be associated with confidences.

In some examples, the static rule KB component 212 may receive a goal with the context and may return a list of rules based on the reasoning algorithm implemented. For instance, the symbolic reasoning engine 208 may implement a backward direction algorithm, the static rule KB component 212 may return a list of rules whose consequent unifies (matches) the goal and the rules have "relevance-similarity," which is determined using a similarity function, to the context greater than predetermined threshold confidence. In an alternative and/or additional example, the symbolic reasoning engine 208 may implement a forward direction algorithm, the static rule KB component 212 may return a list of rules with antecedents that unifies with the goal, wherein the goal may be a conjunction of logical formulae.

The dynamic rule generator 214 may receive a target proposition (e.g., input goal) and may output a scored list of hypothesized rules that could be used to prove the target proposition. In some examples, the dynamic rule generator 214 may receive a knowledge base (KB) as input and may determine one or more general rule templates to use. The dynamic rule generator 214 may use the input KB to help connect the dots when the knowledge required for inference is missing from a static KB (e.g., cannot be found by the static rule KB component 212). The general rule templates may include rules with variables to be replaced with constants.

In various examples, the dynamic rule generator 214 may implement a latent generative model that does not explicitly encode all the rules and may use a statistical model approach to implicitly capture the rule knowledge and generate explicit rules on demand. The dynamic rule generator 214 may use a statistical model trained on structured rule applications in different contexts. The statistical model may generate new rules each leading to the target proposition (e.g., input goal) and associate each rule with a certain precision/confidence. The dynamic rule generator 214 can generate unstructured or structured probabilistic rules given a specific context.

In some examples, the dynamic rule generator 214 and other components of the dynamic reasoning system 206 may improve from feedback received from the user(s) 104. For instance, as described herein with respect to FIG. 1, when the example explanations interface 120 is presented to the user(s) 104 in the application interface, the dynamic reasoning system 206 may receive feedback on which inference rules in context are correct or incorrect. As described here, this feedback is useful to the static rule KB component 212 (e.g., to increase its coverage), the dynamic rule generator 214 (e.g., as new training data to improve the statistical model) and the symbolic reasoning engine 208 (e.g., the knowledge in a reinforcement learning strategy that guides the proof exploration process).

In some instances, the dynamic rule generator 214 can correspond to the dynamic rule generator 114 of FIG. 1 and/or the dynamic rule generator 608 of FIG. 6.

The application(s) 216 may include any computer applications that integrate the dynamic reasoning system 206.

In a non-limiting example, the application(s) 216 may include a natural language understanding (NLU) application 218 and associated components. It is to be appreciated that the NLU application 218, as described herein, is used merely as an example of how the dynamic reasoning system 206 can be configured for use in a specific application setting, but the dynamic reasoning system 206 is configured for use with different application settings.

The NLU application 218 may include a question-answering (QA) dialog engine 220, a semantic parser 222, a semantic textualizer 224, and an inference rules component 226.

In some instances, the NLU application 218 can correspond to the NLU application 110 of FIG. 1 and the NLU application 604 of FIG. 6.

The QA dialog engine 220 may engage with the user(s) 104 through interactive dialog, as described herein. The NLU application 110 generates a user interface to engage in question-answering sessions with the user(s) 104 by natural language expressions. For instance, the user(s) 104 may type in questions in natural language text and the system may return logical proofs as answers and/or explanations in textual form.

The QA dialog engine 220 allows the computing device(s) 102 to engage in extended dialog sessions with an individual human user(s) 104 via the device(s) 106. Each dialog session may be carried out as a serial linear dialog involving only one user, or in a distributed manner to distribute questions to multiple human users in parallel. Distributed dialog applies flexible dialog management in disassembling the content of a dialog session to ask questions to different users and reassembling the results to achieve essentially the same or similar learned outcome as a linear dialog. Distributed dialog sessions allow the device(s) 106 to scale by managing the cognitive load of questions across a crowd of users, thereby reducing latency of the learning process through parallelized interactions with multiple users.

In some examples, the NLU application 110 may receive a natural language reading content and a reading comprehension task to learn the natural language reading content. The NLU application 110 may use one or more models and/or parsers to process the reading content. The NLU application 110 may receive or generate a question to answer in the context of the reading content. The NLU application 110 may interact with the symbolic reasoning engine 112 to provide an answer and may request a confirmation of the answer from the user(s) 104.

Figure 3:
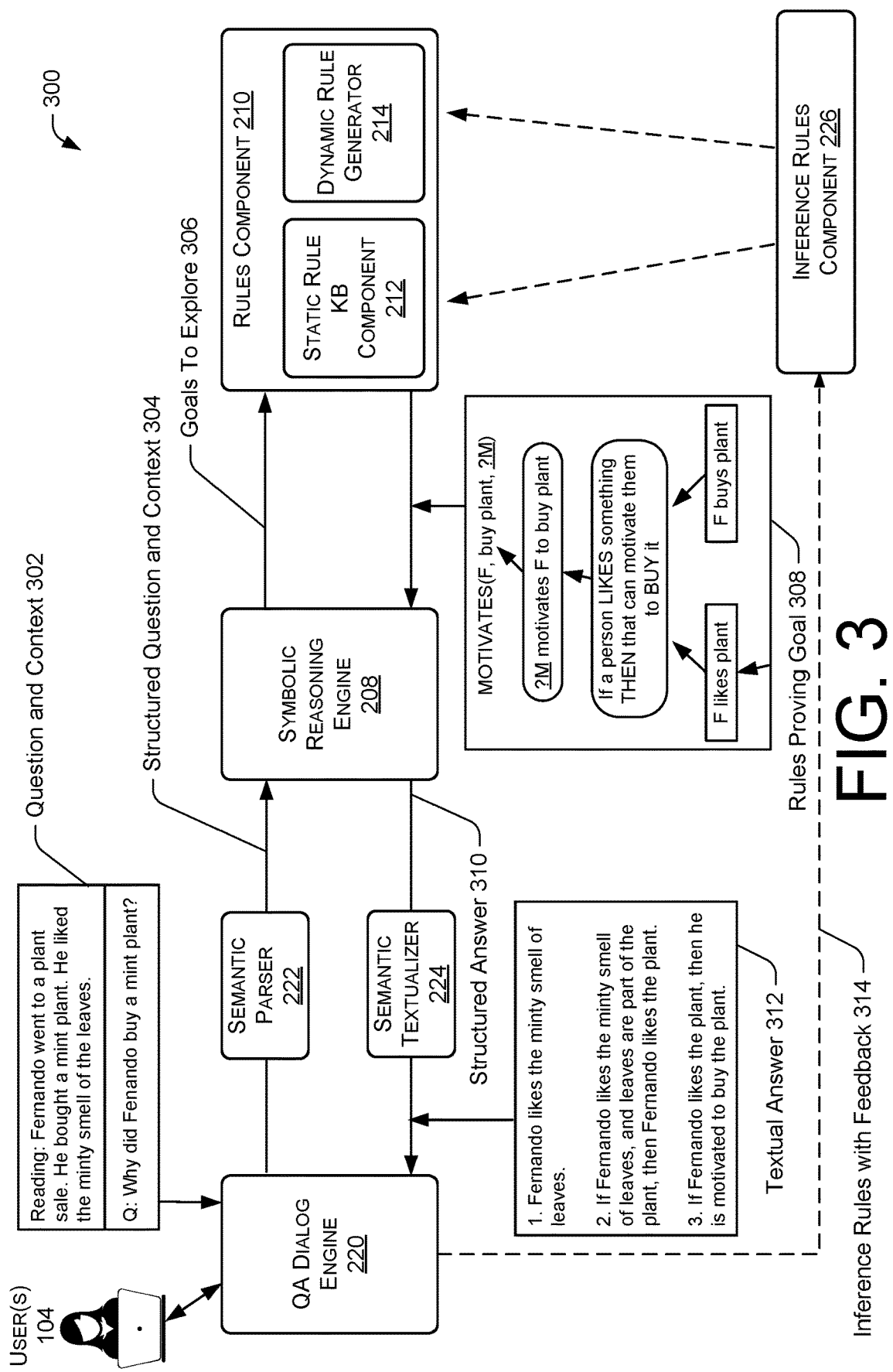
FIG. 3 is a block diagram of an example implementation of a symbolic reasoning engine and rule surfacing component employed by the architecture of FIG. 2.

In some instances, the QA dialog engine 220 can correspond to the QA dialog engine 220 of FIG. 3.

The semantic parser 222 may include a parser that converts textual representations to structured knowledge. The semantic parser 222 may convert any input question/context, as received in text form, to structured queries/facts for the symbolic reasoning engine 208.

The structured knowledge may use the core-theory of the symbolic reasoning engine that is expected to process it. For example, suppose a core-theory uses a frame-slot structure (e.g. FrameNet, Fillmore et al, 2001) for representing concepts/relations, and the concept of "buying" is represented as:

frame/buy(agent:<buyer>,theme:<bought-item>)

where the predicate/relation is "frame/buying" and the arguments of the predicate (i.e., "slots") are "agent" and "theme." Wherein, given the text: "Fernando bought a plant." The semantic parser 222 may convert the text to the following structured form:

frame/buy(agent:Fernando,theme:plant).

The semantic textualizer 224 may produce an unstructured natural language representation of a structured logical form. In examples, the semantic textualizer 224 may serve as an inverse function of the semantic parser 222. The semantic textualizer 224 may receive structured proofs from the symbolic reasoning engine 208 and may produce natural language explanations from the structured proofs.

The inference rules component 226 may include a knowledge base of inference rules with the associated context. For instance, if the NLU application 218 is a reading-understanding system, the context can include the reading content text along with the question. In some examples, the rules may include textual (unstructured) form or structured form. The rule-applications can be positive (correct rule application in this context) or negative (incorrect rule application in the context).

In some examples, the inference rules component 226 may include rules that are fully bound and/or partially bound. The fully bound rules include rule templates with variables that are replaced with constants. The partially bound rules include rule templates containing variables only. The rules can be crowdsourced via a standalone knowledge acquisition task, extracted from large corpora, or acquired via dialog with the user(s) 104 in the NLU application 218, as described herein.

The master-worker component 228 may implement a master-worker architect to construct a proof graph. To construct the proof graph, the master-worker component 228 may explore the rules chaining in parallel. The system may be assigned a task to answer an input query, the master-worker component 228 may process the primary goal with a "master" and may generate multiple "workers" to explore multiple rules paths in parallel. As will be described with more details herein with respect to FIG. 6, the master task builds the entire proof graph for the input goal by communicating with a set of worker tasks, each of which uses provers to perform local graph-based reasoning. The master algorithm is may include a generic, parallelized, graph building approach that continuously modifies a central graph based on asynchronous updates coming in from the workers.

In an example, the present system may use a backward chainer algorithm and may retrieve rules leading to an original query. The system may call the dynamic rule generator 214 which uses a statistical model trained on structured rule applications in different contexts. The master-worker component 228 may create workers to perform statistical modeling to generate new rules each leading to the original query.

In various examples, the system may train one or more ML model(s) 230 using labeled data as training data. Machine learning generally involves processing a set of examples (called "training data") to train one or more ML model(s) 230. The model(s) 230, once trained, is a learned mechanism that can receive new data as input and estimate or predict a result as output. Additionally, the model(s) 230 may output a confidence score associated with the predicted result. The confidence score may be determined using probabilistic classification and/or weighted classification. For example, a trained ML model(s) 230 can comprise a classifier that is tasked with classifying unknown input as one of the multiple class labels. In additional examples, the model(s) 230 can be retrained with additional and/or new training data labeled with one or more new types (e.g., rules) to teach the model(s) 230 to classify unknown input by types that may now include the one or more new types.

In additional and/or alternative examples, the ML model(s) 230 may include a generative model which is a statistical model that can generate new data instances. Generative modeling generally involves performing statistical modeling on a set of data instances X and a set of labels Y in order to determine the joint probability p(X, Y) or the joint probability distribution on X×Y. In various examples, the statistical model may use neural network models to learn an algorithm to approximate the model distribution. In some examples, the generative model may be trained to receive input conditions as context and may output a full or partial rule. In an additional example, the generative model may include a confidence calibrator which may output the confidence associated with the rule generated by the generative model. As described herein, the dynamic rule generator 214 may use a generative model that generates unstructured probabilistic rules and/or structured probabilistic rules based on the input context.

In the context of the present disclosure, the input may include, data that is to be handled according to its context, and the trained ML model(s) 230 may be tasked with receiving an input goal and outputting a rule that connects the input goal with the context. For instance, as described herein, the system may use a generative model that receives an input goal, "Person motivated to buy X" and an input context which includes facts such as, "Person likes X", and the generative model can connect the context to the goal via a rule such as "Person likes X→motivates Person to buy X" and return the generated rule.

In some examples, the trained ML model(s) 230 may classify an input query with context as relevant to one of the inference rules and determine an associated confidence score. In various examples, if the trained ML model(s) 230 has low confidence (e.g., a confidence score is at or below a low threshold) in its proof for an explanation to an input query, this low confidence may return no rules found. An extremely high confidence score (e.g., a confidence score is at or exceeds a high threshold) may indicate the rule is a proof for an input query. After the inference rule has been applied to an explanation, the data with the inference rules may be labeled as correct or incorrect by a user, the data may be used as additional training data to retrain the model(s) 230. Thus, the system may retrain the ML model(s) 230 with the additional training data to generate the new ML model(s) 230. The new ML model(s) 230 may be applied to new inference rules as a continuous retraining cycle to improve the rules generator.

The ML model(s) 230 may represent a single model or an ensemble of base-level ML models and may be implemented as any type of model(s) 230. For example, suitable ML model(s) 230 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation-maximization, genetic algorithms, linear regression algorithms, nonlinear regression algorithms, logistic regression-based classification models, linear discriminant analysis (LDA), generative models, discriminative models, or an ensemble thereof An "ensemble" can comprise a collection of the model(s) 230 whose outputs are combined, such as by using weighted averaging or voting. The individual ML models of an ensemble can differ in their expertise, and the ensemble can operate as a committee of individual ML models that are collectively "smarter" than any individual machine learning model of the ensemble.

The data store 232 may store at least some data including, but not limited to, data collected from the dynamic reasoning system 206, the application(s) 216, and the model(s) 230, including data associated with rules data, knowledge base data, core theory data, natural language data, general rule templates data and training data. In some examples, the data may be automatically added via a computing device (e.g., the computing device(s) 102, the device(s) 106). The rules data may include static rules data and generated inference rules data and may correspond to one or more context. In various examples, the static rules data may include a fixed collection of rules, the individual rules may be associated with a confidence level. As described herein, the symbolic reasoning engine 208 may operate over a specific core theory of logical forms (e.g., logical predicates, functions, formulae) which can be interpreted by the reasoner, and the core theory data may include vocabulary data and any data to produce rules that conform to the core-theory. For instance, if the core-theory uses a frame-slot structure (e.g. FrameNet) for representing concepts/relations, then the core theory data may include frame structure data, concept and relationship data, ontology data, and the like. Training data may include any portion of the data in the data store 232 that is selected to be used to train one or more ML models. In additional and/or alternative examples, at least some of the data may be stored in a storage system or other data repository.

FIG. 3 illustrates an example implementation 300 of select components that may be configured to be used with components of a natural language understanding (NLU) application. The select components may include the symbolic reasoning engine 208, the rules component 210, the static rule KB component 212, and the dynamic rule generator 214. The NLU application may include the QA dialog engine 220, the semantic parser 222, the semantic textualizer 224, and the inference rules component 226. The QA dialog engine 220 allows the computing device(s) 102 to engage in extended dialog sessions with an individual human user(s) 104 via the device(s) 106. The example processes and process data may include example question and context 302, example structured question and context 304, example goals to explore 306, example rules proving goal 308, example structured answer 310, example textual answer 312, and example inference rules with feedback 314.

As a non-limiting example, the QA dialog engine 220 may receive the example question and context 302 as a reading comprehension task and pass the textual form of the reading content and question to the semantic parser 222 to convert to structured representation. The reading content portion of the example question and context 302 may be converted to a list of structured facts. For instance, the examples rules proving goal 308 includes the structured fact "F likes plant" and "F buys plant." The semantic parser 222 may generate and pass the example structured question and context 304 to the symbolic reasoning engine 208.

In the present example, the symbolic reasoning engine 208 uses a backward chaining algorithm to construct a proof graph. The symbolic reasoning engine 208 may determine the example goals to explore 306 and may call the rules component 210 to retrieve a list of rules using either the static rule KB component 212 or the dynamic rule generator 214. The rules component 210 may retrieve a list of rules in response to the input goal and may output a ranked list of rules retrieved for the symbolic reasoning engine 208. The process of (1) the symbolic reasoning engine 208 passing in a goal and/or sub-goal to explore; and (2) the rules component 210 outputs a list of ranked rules proving the goal and/or sub-goal may repeat until the symbolic reasoning engine 208 determines a process completion condition is met.

In examples, the symbolic reasoning engine 208 starts the example rules proving goal 308 with the query at the top and expands the graph by back-chaining on relevant rules (rounded rectangles in the figure). The rule conditions are matched by facts (rectangles with sharp corners in the example rules proving goal 308 figure) or by the conclusions of other rules. The symbolic reasoning engine 208 continues this process iteratively until either the symbolic reasoning engine 208 finds a complete proof or fails to find complete proofs within practical resource limits. The process and an example complete proof may be described herein with more details in FIG. 4.

The symbolic reasoning engine 208 may output the example structured answer 310, that may be passed to the semantic textualizer 224 to translate the structure representation back to natural language text for the QA dialog engine 220. The semantic textualizer 224 may produce the example textual answer 312 from the list of proofs. The QA dialog engine 220 may present the list of proofs to the user(s) 104 to provide feedback on whether the individual inferred rules from the list of proofs are correct or incorrect.

In some examples, the inference rules component 226 may gather and store the example inference rules with feedback 314. The individual stored rules with feedback may be used to train models for generating rules and reasoning. In particular, for each part of the example textual answer 312 that is confirmed/denied, the system the feedback to improve the components as:

confirmed textual inference rule→positive data point for the semantic textualizer 224 and the dynamic rule generator 214
confirmed textual fact→positive data point for the semantic parser 222 and the semantic textualizer 224
denied textual inference rule→negative data point for the semantic textualizer 224 or the dynamic rule generator 214
denied textual fact→negative data point for the semantic textualizer 224 or the semantic parser 222

As depicted in FIG. 3, in the example textual answer 312, rule 1 is a textual fact, while rules 2 and 3 are textual inference rules. In the example textual answer 312, the user(s) 104 may indicate that the explanation is correct, in which case rule 1 is a positive example for the semantic parser 222, while rules 2 and 3 are positive examples to improve the dynamic rule generator 214. In some examples, the present system may continuously interact with the user(s) 104 and asks the user(s) 104 to rate individual rules of the textual explanations to improve the underlying components over time.

Figure 4:
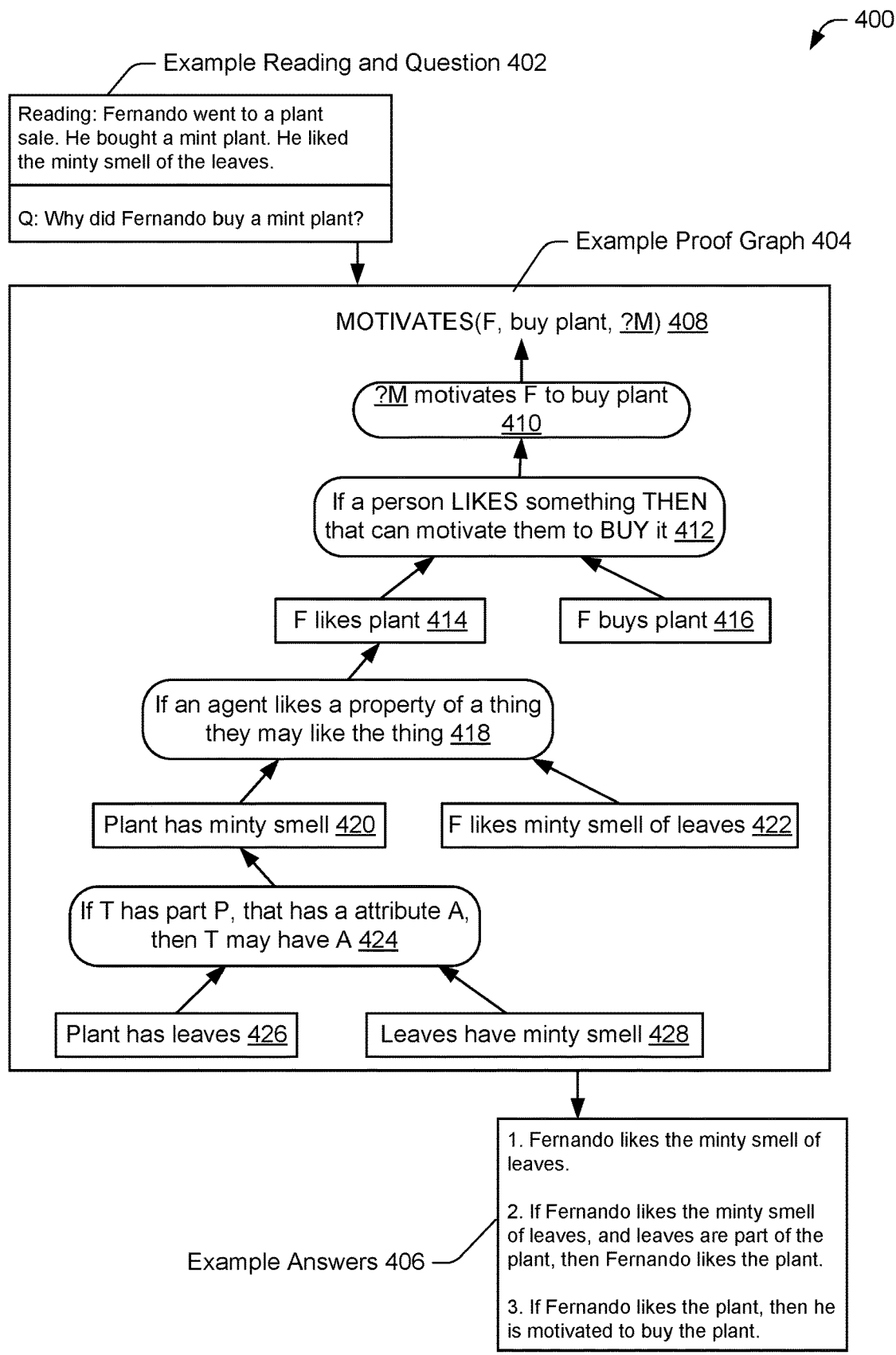
FIG. 4 illustrates an example process for an example input reading and question, an example proof graph, and an example answers as generated by the present disclosure.

FIG. 4 illustrates process 400 including an example of an example input reading content and question 402, an example proof graph 404, and an example answers 406 as generated by the present disclosure. The process 400 is described with reference to the system 100 and may be performed by the device(s) 106 and/or in cooperation with any one or more of the computing device(s) 102. Of course, the process 400 (and other processes described herein) may be performed in other similar and/or different environments.

The example proof graph 404 may include example relevant rules 412, 418, and 424, and example factual rules 414, 416, 420, 422, 426, and 428.

As a non-limiting example, the present system may receive the example input reading content and question 402. The question: "Why did Fernando buy a mint plant?" may be converted to the example query 408 indicated as the structured representation:

MOTIVATES(*F*,buy plant,?*M*)

Wherein F denotes "Fernando" and ?M denotes a variable in the query that needs to be filled in by a reasoner.

The example proof graph 404 may be generated using a backward chaining algorithm. Accordingly, the system starts with the example query 408 at the top and expands the graph by back-chaining on relevant rules (indicated by rounded rectangles in FIG. 4 as the example relevant rules 412, 418, and 424). The rule conditions are matched by facts (rectangles in FIG. 4 as the example factual rules 414, 416, 420, 422, 426, and 428) and the process continues iteratively till either the reasoner finds a complete proof, as is the case of the present example, wherein all the necessary rule-conditions are satisfied by facts, or lands up with a failed proof where some rule conditions are left unsatisfied.

The system dynamically generates the example answers 406 during run-time using a dynamic rule generator and not using pre-defined rules in an explicit rule knowledge base. For instance, the system may generate rules such as, "If a person likes something, they are motivated to buy it," which is a general common-sense rule. The system may use a dynamic rule generating model, which given the goal, "Person motivated to buy X" and a context which includes facts such as "Person likes X", can connect the context to the goal via a rule such as "Person likes X→motivates Person to buy X" and return the example relevant rules 412 as the generated rule to the symbolic reasoning engine.

Figure 5:
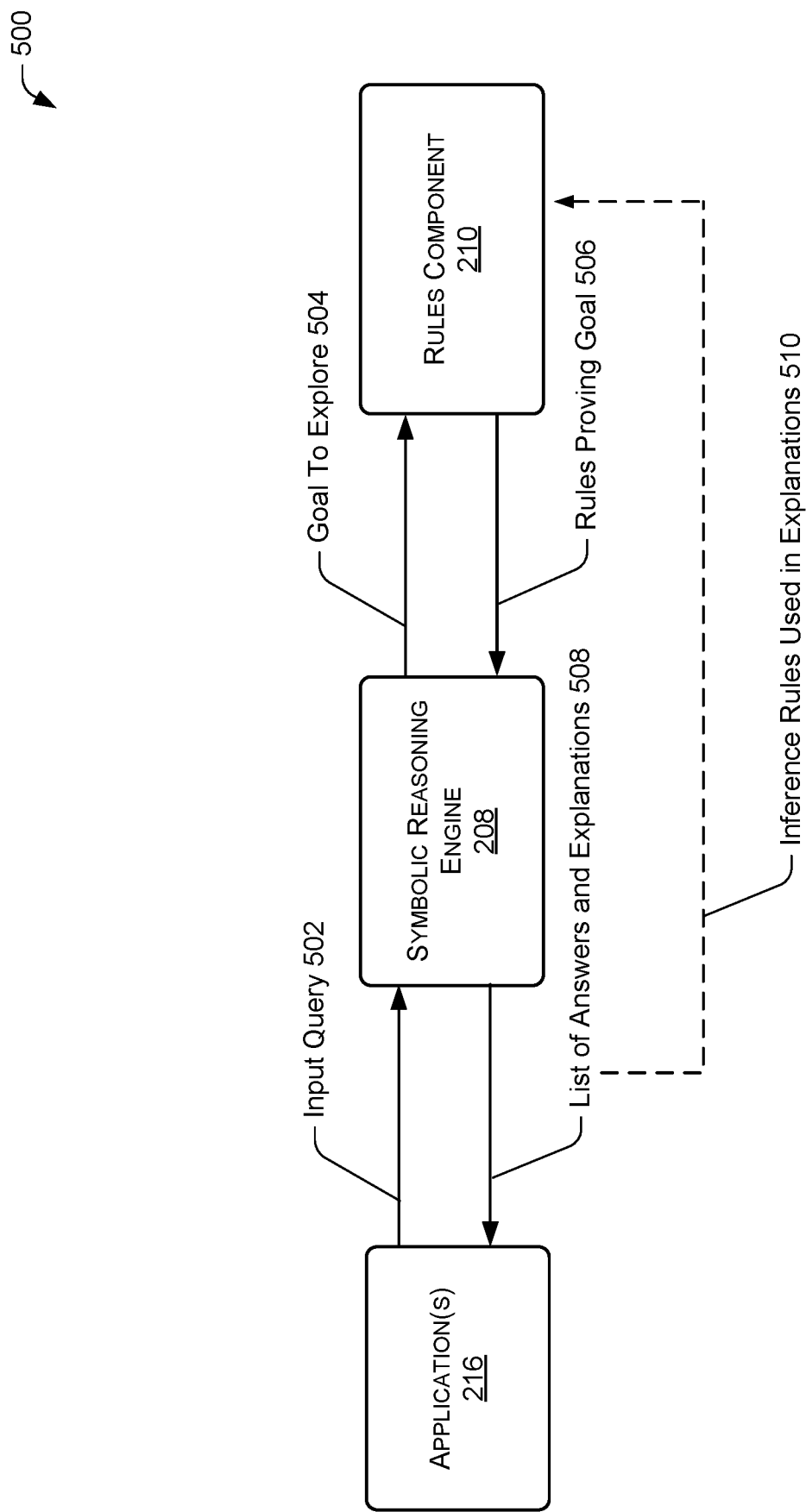
FIG. 5 is a block diagram of an example implementation of a symbolic reasoning engine and rule component employed by the architecture of FIG. 2.

FIG. 5 illustrates an example implementation 500 of select components that may be configured to be used with the application(s) 216. The select components may include the symbolic reasoning engine 208 and the rules component 210.

As a non-limiting example, the symbolic reasoning engine 208 and the rules component 210 may be configured to work with different application settings outside of the previously illustrated example NLU application 218. For instance, the symbolic reasoning engine 208 may receive the example input query 502 from the application(s) 216. The example input query 502 may include context generated by the application(s) 216. The symbolic reasoning engine 208 may determine the primary and/or secondary goal to explore based on the example input query 502. The symbolic reasoning engine 208 may iteratively call the rules component 210 with an example goal to explore 504. The rules component 210 may retrieve a list of rules, with confidence associated with individual rules, that proves the example goal to explore 504, as received from the symbolic reasoning engine 208, and return example rules proving goal 506. The rules component 210 may rank or re-rank the list of rules before returning the example rules proving goal 506.

The symbolic reasoning engine 208 may determine whether it found a complete proof, wherein all the necessary rule-conditions are satisfied by facts or a failed proof where some rule conditions are left unsatisfied. In some examples, the symbolic reasoning engine 208 may determine to repeat the process of calling the rules component 210 with an example goal to explore 504 until the symbolic reasoning engine 208 can match rule conditions with facts in the context, wherein a valid proof is found. In additional examples, the symbolic reasoning engine 208 may determine no more rules can be found above a certain confidence threshold and determine that the system has failed to find complete proofs within practical resource limits.

As shown in FIG. 5, the symbolic reasoning engine 208 may output an example list of answers and explanations 508, that may be passed to the application(s) 216. In various examples, the example list of answers and explanations 508 may receive feedback from an end-user and/or may be stored as example inference rules used in explanations 510 and may be used as inferred rules by the rules component 210 in future rules retrieving or generating.

FIG. 6 illustrates an example system 600 including a symbolic reasoning engine and a dynamic rule generator that is configured to generate the example logical interpretations, as described herein. In general, the example system 600 provides a system running on a computing device(s) 602 that can correspond to the computing device(s) 102 of FIG. 1.

As depicted in FIG. 6, one or more computing device(s) 602 comprises an NLU application 604, a symbolic reasoning engine 606, and a dynamic rule generator 608. The NLU application 604, the symbolic reasoning engine 606, and the dynamic rule generator 608 may be configured to provide functionality similar to the QA dialog engine 220, a symbolic reasoning engine 208, and a dynamic rule generator 214 of FIG. 2, respectively.

The symbolic reasoning engine 606 may include a unifier component 610 and a prover component 612.

The unifier component 610 may be based on any statistical techniques that can propose and score mappings between the terms of two logical propositions. For instance, the unifier component 610 can leverage deep-learning-based matching functions as unifiers. The unifier component 610 helps the symbolic reasoning engine 606 find proofs even when primary or secondary goals, rule conditions, and/or facts do not align perfectly.

In some examples, the unifier component 610 may include a standard unification function (also known as syntactic unification) that takes a pair of propositional formulas P1, P2, and checks if there exists a mapping of variables from one to the other which makes the two formulae equal. For instance, the propositions hasPossession (Zoe, ?y) and hasPossession(?x, plant) unify with the mapping {?x=Zoe, ?y=plant}.

The unifier component 610 may generalize the notion of unification to be any propositional formulae matching function, defined as follows:

$$\text{unify}:(P1,P2,K) \rightarrow \{UR1 \ldots URn\}$$

where P1, P2 are propositions, K is the knowledge base (which acts as the context for the matching) and {UR1 . . . URn} is a set of Unification Results, where each UR contains the following information: a substitution that maps variables or even entities in one proposition to the other; score (0-1) which reflects the confidence of the mapping; and additional metadata used by the unifier function when making its decision, which can be exposed by the symbolic reasoning engine 606 in a final explanation.

In a non-limiting example, the example reading content and question 614, where the reading content interpretation contains the proposition action(put), while the question interpretation has the proposition action(place). Under standard unification, both these propositions would not unify, as they are different formulas. However, the unifier component 610 can design a custom unification function that looks at word/phrase similarity to align the two actions, using the KB information that they share the same agent (Zoe) and after-state (i.e., plant being near the window) to boost the match score. Such a function may return $$\text{unify}(\text{action}(put),\text{action}(place)) \rightarrow (\{place=put\},0.9).$$

Like a traditional SLD resolution, which may build out a search tree for a given query/goal, the symbolic reasoning engine 606 may construct a proof graph by using unification methods to backchain on clauses (rules/facts) in the KB.

The prover component 612 may support various reasoning algorithms and may include a function which given a (sub) goal and the KB, performs a "single step" expansion of the graph along a particular reasoning path.

$$\text{prover}:(G,K) \rightarrow PD$$

where G is the input goal, K is the knowledge base, and PD is a partial proof-derivation DAG which has the following properties:

The DAG has two types of nodes: goal nodes and support nodes. Support nodes provide justification for some goal node and play a key role in the flow of information (e.g. solution bindings) in the overall proof graph, as we shall see later.

G is one of the roots of the graph

Goal and support nodes in the graph are interleaved, i.e. a goal node can only have support nodes as its children (and vice versa).

In some examples, the prover component 612 can find rules in the input KB whose respective consequents unify with the goal (using any implementation of the unifier component 610 as defined earlier), and then output a partial proof-tree which has the goal as its root, a "rule-support" child node for each such rule that satisfies the condition above, and an additional edge from each support node to the corresponding antecedent of the rule, which forms new sub-goals. In various examples, the prover component 612 does not need to prove the antecedents. An advantage of this implementation of the unifier component 610 and the prover component 612 is the scalability for deployment in a distributed setting—each prover performs a local computation, without requiring knowledge about the overall proof-graph, which enables parallelization across cores and machines. As described herein, the present system may use the master-worker component 228 to perform a "master" task, which builds the entire proof graph for an input goal, by communicating with a set of "worker" tasks, which use the prover component 612 to perform local graph-based reasoning. The communication between the "master" algorithm, which constructs the entire proof graph, and each individual "worker" prover is kept to a minimum.

As described herein, the symbolic reasoning engine 606 may receive an input goal and may generate a proof graph for the input goal. The symbolic reasoning engine 606 may use a master to build the proof graph. The master may task each work with a request to expand the goal node. The workers may explore nodes in parallel but will perform a single step of expansion in the proof. Each worker is configured with a set of provers and responds to incoming work requests from the master by running the provers on the incoming goal. The workers may each call the dynamic rules generator 608 to generate a rule to fulfill the incoming work requests. The master may determine after each node expansion whether a particular continue expanding a node within a current branch or switch to a node on a different branching with the graph. In various examples, the master may receive different rules from the workers and may unionize the rules. In some examples, the master may determine all the conditions to fulfill the input goal is met and the symbolic reasoning engine 606 may return the complete proof graph. In an alternative example, the master may determine the proof graph is constructed as far as the rules allow but the graph is incomplete due to one or more conditions are not met and the symbolic reasoning engine 606 may return the incomplete proof graph with a "hint" request.

As a non-limiting example, the NLU application may receive the example reading content and question 614. The system may generate the example logical interpretation 616 as the structured representation of the reading content and the example logical interpretation 618 as the structured representation of the question. The system may be tasked with the following reasoning task:

motivates(?agent,?action,?goal):–hasGoal(?agent, ?goal)^leadsTo(?action,?goal)

As described herein, the dynamic rule generator 608 may provide missing rule knowledge during run-time to the symbolic reasoning engine 606. In some examples, the dynamic rule generator 608 may receive a knowledge base and the example logical interpretation 618 as the target goal and may return rules relevant to proving the target goal. In some examples, the dynamic rule generator 608 may generate grounded rules from highly general rule patterns/templates from the knowledge base.

In an example, the dynamic rule generator 608 may determine to generate rules with two templates. The two templates may be explored by two different workers in parallel.

have learned this particular inference rule in a prior reading-understanding task, and the system may generalize the inference rule to create the general template rule, by replacing all the constants in the rule (e.g. the specific name of the child or toy) with variables to create the template. The system may store the type information for the variables—Child, Toy, Functional are all types in the present type system (derived from WordNet)—along with the template in the general rule templates knowledge base in the data store 232. When the template produces an incorrect rule application in a different context, the system may also store the negative typed bindings in the rule KB as well.

The symbolic reasoning engine 606 may generate the following logical proof:

motivates(Zoe, e3, hasState(plant, Healthy)):—hasGoal (Zoe, hasState(plant, Healthy))^leadsTo(e3, hasState (plant, Healthy)) [Rule_1]
hasGoal(Zoe, hasState(plant, Healthy)):—hasPossession(Zoe, plant) [Rule_2]
hasPossession(Zoe, plant):—give(e1)^recipient (e1, Zoe)^theme(e1, plant) [Rule_3]
hasState(plant, Healthy):—contact(plant, light, ambient, high) [0.8] [Rule_4]
contact(plant, light, ambient, high):—contact(window, light, ambient, high)^near(plant, window) [Rule_5]
near(plant, window):—put(e2)^theme(e2, plant)^destination(e2, window, near) [Rule_6]
contact(window, light, ambient, high) hasProperty (window, sunny) [Rule_7]
put (e2) place(e3) [0.9] [FUZZY UNIFICATION]

In the present example, rules Rule_1, Rule_2, Rule_4, and Rule_5, may be dynamically generated, while Rule_3, Rule_6, and Rule_7 may be derived by an ontology database. The NLU application 604 may generate the example textualized output:

Zoey possesses a plant therefore she wants it to be healthy. This motivates her to move the plant to the window.

Figure 7:
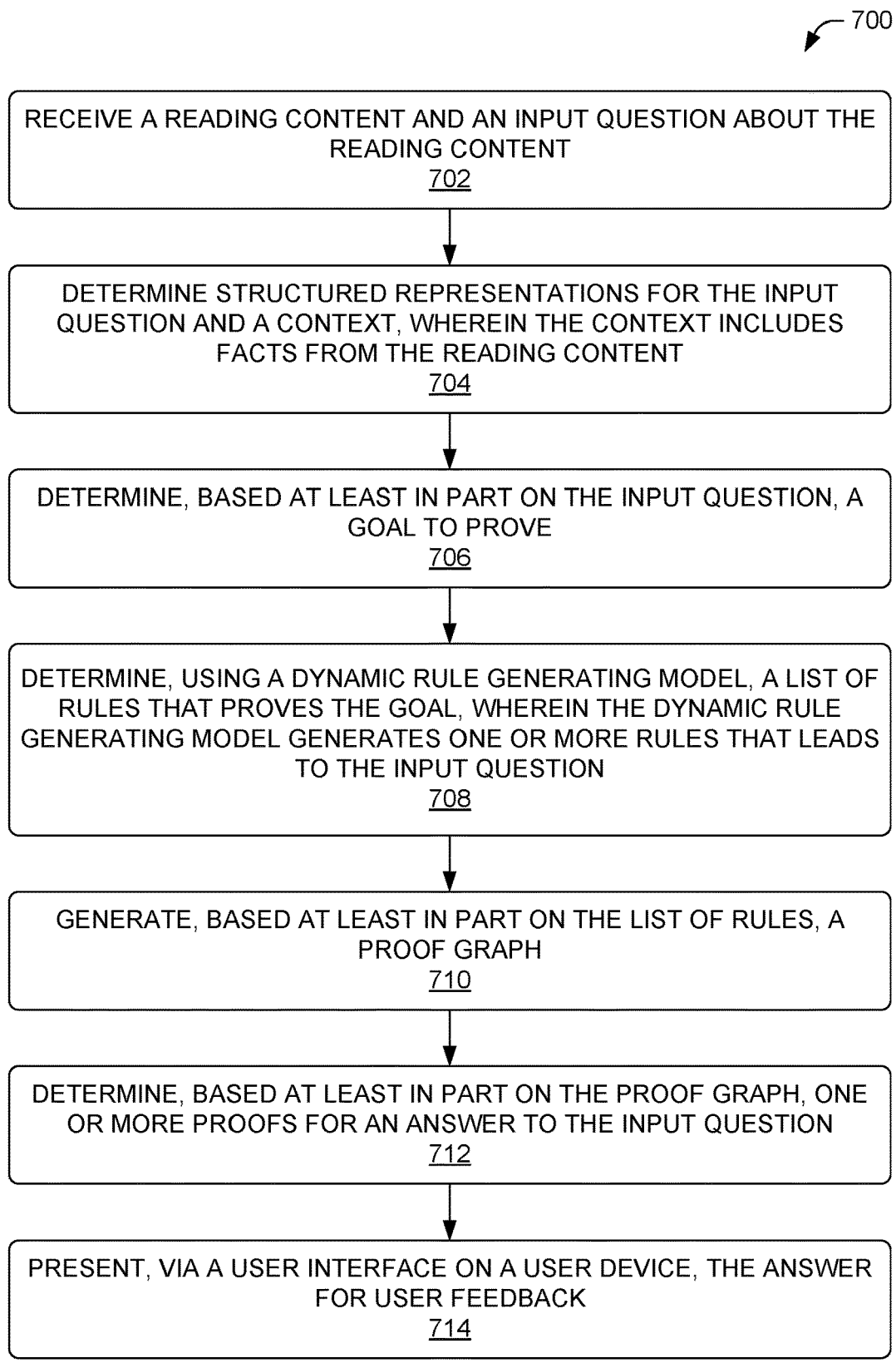
FIG. 7 illustrates an example process for a reasoning engine that calls a dynamic rule generator in a natural language understanding (NLU) application setting, as discussed herein.
Figure 8:
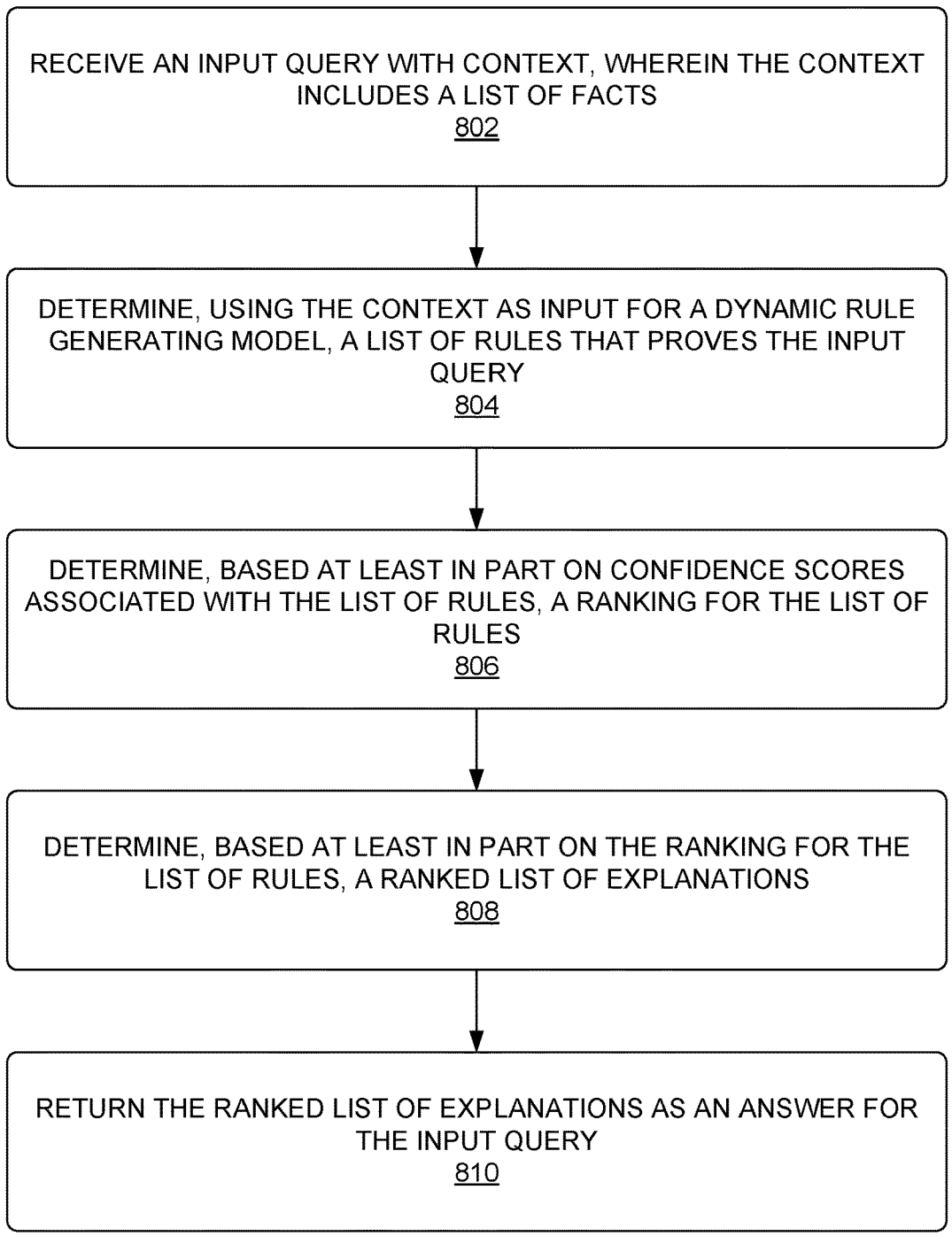
FIG. 8 illustrates an example process for a reasoning engine that calls a dynamic rule generator in a computer application setting, as discussed herein.

FIGS. 7, and 8 are flow diagrams of illustrative processes. The example processes are described in the context of the environment of FIG. 2 but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processors 202, perform the recited operations. Generally, computer-executable instructions include routines, programs, objects, components, data struc-

| General Rule Template | Prior + Rule Application | Specific Rule for Alice-Zoe |
| --- | --- | --- |
| hasGoal(?agent, hasState(?object, ?state)):- hasPossession(?agent, ?object) | hasGoal(?Child, hasState (?Toy, Functional)):- hasPossession(?Child, ?Toy) | hasGoal(Zoe, hasState (plant, Healthy)):- hasPossession(Zoe, plant) [0.8] |
| hasState(?object, ?state):- contact(?object, ?theme, ?proximity, ?degree) | hasState(?Battery, Damaged):- contact(?Battery, ?Heat, Ambient, High) | hasState(plant, Healthy):- contact(plant, light, Ambient, High) [0.75] |

In the present example, the first template may capture the notion that someone who possesses an object wants that object to be in a particular state. For instance, a child who possesses a toy wants it to be functional. The system may tures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 7 is a flow diagram of illustrative process 700 for a reasoning engine that calls a dynamic rule generator in a natural language understanding (NLU) application setting. The process 700 is described with reference to the system 100 and may be performed by one or more of the computing device(s) 102, 602 and/or in cooperation with any one or more of the device(s) 106. Of course, the process 700 (and other processes described herein) may be performed in other similar and/or different environments.

At operation 702, the process may include receiving a reading content and an input question about the reading content. For instance, the computing device(s) 102, 602 or the device(s) 106 may receive the reading content and the input question about the reading content. The input question may be a question received from the user(s) 104 via the device(s) 106 or may be a task generated by the computing device(s) 102.

At operation 704, the process may include determining structured representations for the input question and a context, wherein the context includes facts from the reading content. For instance, the computing device(s) 102, 602 or the device(s) 106 may employ a variety of techniques as described herein to process the reading content and an input question to determine structured representations for the input question and a context. The incident may be representative of malicious behavior associated with a process or a thread.

At operation 706, the process may include determining, based at least in part on the input question, a goal to prove. For instance, the computing device(s) 102, 602 or the device(s) 106 may determine, based at least in part on the input question, a goal to prove. The goal to prove may include a number of conditional rules that must be met for the proof to be complete.

At operation 708, the process may include determining, using a rule generating model, a list of rules that proves the goal, wherein the rule generating model generates one or more rules that lead to the input question. For instance, the computing device(s) 102, 602 or the device(s) 106 may determine, using a rule generating model, a list of rules that proves the goal, wherein the rule generating model generates one or more rules that lead to the input question.

At operation 710, the process may include generating, based at least in part on the list of rules, a proof graph. For instance, the computing device(s) 102, 602 or the device(s) 106 may generate, based at least in part on the list of rules, a proof graph.

At operation 712, the process may include determining, based at least in part on the proof graph, one or more proofs for an answer for the input question. For instance, the computing device(s) 102, 602 or the device(s) 106 may determine, based at least in part on the proof graph, one or more proofs for an answer for the input question.

At operation 714, the process may include presenting, via a user interface on user device, the answer for user feedback. For instance, the computing device(s) 102, 602 or the device(s) 106 may present, via a user interface on user device, the answer for user feedback. The system may generate a user interface to present the answers for user feedback via the device(s) 106. The system may store the user feedback with inferred rules that explains the answer.

FIG. 8 is a flow diagram of illustrative process 800 for a reasoning engine that calls a dynamic rule generator in a computer application setting. The process 800 is described with reference to the system 100 and may be performed by one or more of the computing device(s) 102, 602 and/or in cooperation with any one or more of the device(s) 106. Of course, the process 800 (and other processes described herein) may be performed in other similar and/or different environments.

At operation 802, the process may include receiving an input query with a context, wherein the context includes a list of facts. For instance, the computing device(s) 102, 602 or the device(s) 106 may receive an input query with a context, wherein the context includes a list of facts. The input query may be received from the user(s) 104 via the device(s) 106 or may be a task generated by the computing device(s) 102, 602. The context may include a list of facts that provide the particular application setting that the input query is received from.

At operation 804, the process may include determining, using the context as input for a dynamic rule generating model, a list of rules that proves the input query, wherein the rule generating model generates one or more rules that leads to the input query. For instance, the computing device(s) 102, 602 or the device(s) 106 may employ a variety of techniques as described herein to process the input query with the context and generate an input question to determine a list of rules that proves the input query.

At operation 806, the process may include determining, based at least in part on confidence scores associated with the list of rules, a ranking for the list of rules. For instance, the computing device(s) 102, 602 or the device(s) 106 may determine, based at least in part on confidence scores associated with the list of rules, a ranking for the list of rules.

At operation 808, the process may include determining, based at least in part on the ranking for the list of rules, a ranked list of explanations. For instance, the computing device(s) 102, 602 or the device(s) 106 may determine, based at least in part on the ranking for the list of rules, a ranked list of explanations.

At operation 810, the process may include returning the ranked list of explanations as an answer for the input query. For instance, the computing device(s) 102, 602 or the device(s) 106 may return the ranked list of explanations as an answer for the input query. The ranked list of explanations as an answer may be presented via a user interface to the user(s) 104 via the device(s) 106. In some examples, the user(s) 104 may be prompted to provide feedback on the ranked list of explanations and the feedback may be used to improve the system.

Figure 9:
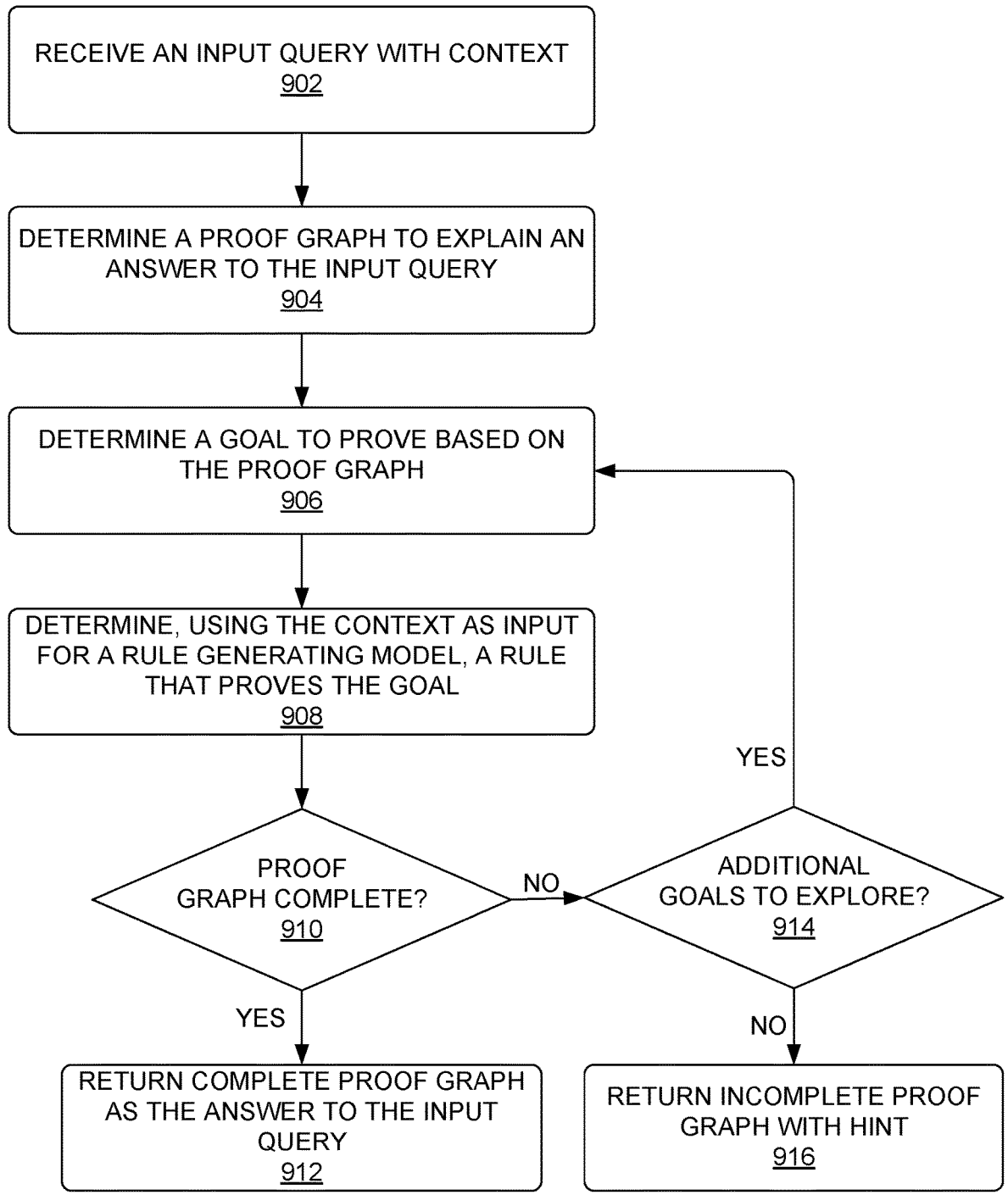
FIG. 9 illustrates an example process for a reasoning engine that iteratively calls a rule generating model, as discussed herein.

FIG. 9 is a flow diagram of illustrative process 900 for a reasoning engine that iteratively calls a rule generating model. The process 900 is described with reference to the system 100 and may be performed by one or more of the computing device(s) 102, 602 and/or in cooperation with any one or more of the device(s) 106. Of course, the process 900 (and other processes described herein) may be performed in other similar and/or different environments.

At operation 902, the process may include receiving an input query with a context. For instance, the computing device(s) 102, 602 or the device(s) 106 may receive an input query with a context. The input query may be received from the user(s) 104 via the device(s) 106 or may be a task generated by the computing device(s) 102, 602. The context may include a list of facts and/or data from a knowledge base.

At operation 904, the process may include determining a proof graph to explain an answer to the input query. For instance, the computing device(s) 102, 602 or the device(s)

106 may employ a variety of techniques as described herein to process the input query with the context and build a proof graph to explain an answer to the input query. Initially, the system may start building a proof graph by setting an initial goal clause (primary goal) as the root of the proof graph. The primary goal may be derived from the input query. The system may continue to build the proof graph by adding secondary goals as support nodes to the primary goal. The system may continue gathering rules that prove the primary goal and/or secondary goal(s) until all conditions needed to support the goal clause are met.

At operation 906, the process may include determining a goal to prove based on the proof graph. For instance, the computing device(s) 102, 602 or the device(s) 106 may determine a goal to prove based on the proof graph. As described herein, the system may determine whether to prove a primary goal or a secondary goal based on the current building state of the proof graph.

At operation 908, the process may include determining, using the context as input for a rule generating model, a rule that proves the goal. For instance, the computing device(s) 102, 602 or the device(s) 106 may employ a variety of techniques as described herein to determine, using the context as input for a rule generating model, a rule that proves the goal. As described herein, the rule generating model may receive an input goal and context and may output one or more probabilistic rules based on the context. The system may determine a rule from the one or more probabilistic rules to build the proof graph. This determination may be based on the confidence associated with each rule from the one or more probabilistic rules.

At operation 910, the process may include determining whether the proof graph is complete. For instance, the computing device(s) 102, 602 or the device(s) 106 may determine whether the proof graph is complete and this may be based on a list of conditions that need to be met by matching the conditions with facts or rules. In some examples, the system may determine that the proof graph is complete because the list of conditions has all been matched, and the process may continue to operation 912. In some examples, the system may determine that the proof graph is incomplete because one or more conditions from the list of conditions have not been matched, and the process may continue to operation 914.

At operation 912, the process may include returning a complete proof graph as the answer to the input query. For instance, the computing device(s) 102, 602 or the device(s) 106 may return a complete proof graph as an answer for the input query. One or more rules from the complete proof graph may be presented via a user interface to the user(s) 104 via the device(s) 106. In some examples, the user(s) 104 may be prompted to provide feedback on one or more rules from the complete proof graph and the feedback may be used to improve the system.

At operation 914, the process may include determining whether there are additional goals to explore to complete the proof graph. For instance, the computing device(s) 102, 602 or the device(s) 106 may determine that the proof graph is not complete and may determine whether there are additional goals to explore to complete the proof graph. In some examples, the system may determine that are additional goals to explore to complete the proof graph and the process may return to operation 906. In some examples, the system may determine that the proof graph is not complete but the system has exhausted rules and goals to explore in order to generate the proof. In the present example, the system may determine that there are no more goals to explore to complete the proof graph and the process may go to operation 916.

At operation 916, the process may include returning the incomplete proof graph with a hint. For instance, the computing device(s) 102, 602 or the device(s) 106 may determine that the proof graph is incomplete and return the incomplete proof graph. The system may determine the proof graph is incomplete and determine one or more hints based on one or more conditions that need to be met to complete the proof graph. The one or more hints may be presented via a user interface to the user(s) 104 via the device(s) 106. In some examples, the user(s) 104 may be prompted to provide feedback on whether the one or more hints could help complete the proof graph and the feedback may be stored as training data for new generative models.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, the software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
receiving a reading content and an input question about the reading content;
determining structured representations for the input question and a context, wherein the context includes facts from the reading content;
determining, based at least in part on the input question, a goal to prove;
determining, using a rule generating model, a list of rules that proves the goal, wherein the rule generating model generates one or more rules that leads to the input question;
generating, based at least in part on the list of rules, a proof graph;
determining, based at least in part on the proof graph, one or more proofs for an answer for the input question;
presenting, via a user interface on user device, the answer including the one or more proofs for user feedback;
receiving a positive feedback for the one or more proofs;
generating one or more inferred rules by replacing constants with variables in the one or more proofs; and
storing the one or more inferred rules with the positive feedback.

2. The computer-implemented method as recited in claim 1, wherein individual rules of the one or more rules are associated with confidence scores and further comprising:
determining, based at least in part on the confidence scores, a confidence for the list of rules.

3. The computer-implemented method as recited in claim 2, further comprising:
determining, based at least in part on a sum of individual confidence scores associated with the list of rules, a confidence score for the answer, wherein determining the one or more proofs for the answer is based at least in part on the confidence score meeting a threshold.

4. The computer-implemented method as recited in claim 1, wherein generating the proof graph includes determining whether rule conditions match the facts in the context or match inference in a partial proof graph.

5. A computer-implemented method comprising:
receiving an input question with a context about a text;
determining, using the context as input for a rule generating model, a list of rules that proves the input question, wherein the rule generating model generates one or more rules that leads to the input question;
determining, based at least in part on the list of rules, a proof graph;
determining, based at least in part on the proof graph, a complete proof is found;
returning the complete proof as an answer to the input question; and
presenting, via a user interface on a user device, one or more inferred rules from the complete proof for user feedback.

6. The computer-implemented method as recited in claim 5, wherein individual rules of the one or more rules are associated with confidence scores and the list of rules is determined based at least in part on the confidence scores, and further comprising:
determining, based at least in part on a sum of individual confidence scores associated with the list of rules, a confidence score for the answer, wherein determining the complete proof is found is based at least in part on the confidence score meeting a threshold.

7. The computer-implemented method as recited in claim 6, further comprising:
receiving a positive feedback for the one or more inferred rules; and
storing the one or more inferred rules with the positive feedback.

8. The computer-implemented method as recited in claim 7, further comprising:
receiving a second input question about the text; and
determining, using the one or more inferred rules with the positive feedback as input for the rule generating model, a second list of rules that proves the second input question.

9. The computer-implemented method as recited in claim 7, further comprising:
receiving a second input question with a second context about a second text; and
determining, using the second context and the one or more inferred rules with the positive feedback as input for the rule generating model, a second list of rules that proves the second input question.

10. The computer-implemented method as recited in claim 9, further comprising:
generating a second proof graph for the second text that includes the second list of rules with the second context leading to the second input question.

11. The computer-implemented method as recited in claim 6, further comprising:
receiving a negative feedback for the one or more inferred rules; and
storing the one or more inferred rules with the negative feedback.

12. The computer-implemented method as recited in claim 11, further comprising:
receiving a second input question about the text; and
determining, using the one or more inferred rules with the negative feedback as input for the rule generating model, a second list of rules that proves the second input question.

13. The computer-implemented method as recited in claim 5, wherein the one or more inferred rules are generated by replacing constants with variables in the complete proof.

14. A system comprising:
one or more processors; and
one or more computer-readable media storing instructions that, when executed by the one or more processors, cause the one or more processors to perform operations comprising:
receiving an input query with a context, wherein the context includes a list of facts;
determining, using the context as input for a rule generating model, a list of rules that proves the input query, wherein the rule generating model generates one or more rules that leads to the input query;
determining, based at least in part on confidence scores associated with the list of rules, a ranking for the list of rules;
determining, based at least in part on the ranking for the list of rules, a ranked list of explanations;
returning the ranked list of explanations for the input query;
presenting, via a user interface on a user device, the ranked list of explanations for user feedback;
receiving the user feedback for the ranked list of explanations;
replacing constants from the ranked list of explanations with variables to generate one or more inferred rules; and storing the one or more inferred rules with the user feedback.

15. The system as recited in claim 14, wherein determining the ranked list of explanations includes generating a proof graph.

16. The system as recited in claim 15, wherein generating the proof graph includes determining whether rule conditions match the list of facts in the context.

17. The system as recited in claim 16, the operations further comprising:
   determining the proof graph is incomplete based at least in part on the rule conditions failing to match the list of facts;
   determining a hint based at least in part on a rule condition that failed to match the list of facts; and
   presenting, via a user interface on a user device, the hint for user feedback.

18. The system as recited in claim 14, wherein individual rules of the one or more rules are associated with confidence scores and the list of rules is determined based at least in part on the confidence scores.

19. The system as recited in claim 18, the operations further comprising:
   determining, based at least in part on a sum of individual confidence scores associated with the list of rules, a confidence score for the ranked list of explanations, wherein determining the ranked list of explanations is based at least in part on the confidence score meeting a threshold.

20. The system as recited in claim 14, the operations further comprising:
   receiving a positive feedback for the one or more inferred rules; and
   storing the one or more inferred rules with the positive feedback.

* * * * *